US011281938B2

(12) United States Patent
Liu et al.

(10) Patent No.: US 11,281,938 B2
(45) Date of Patent: Mar. 22, 2022

(54) IMAGE PROCESSING METHOD, PROCESSING APPARATUS AND PROCESSING DEVICE

(71) Applicant: BOE TECHNOLOGY GROUP CO., LTD, Beijing (CN)

(72) Inventors: Hanwen Liu, Beijing (CN); Pablo Navarrete Michelini, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 584 days.

(21) Appl. No.: 16/329,893

(22) PCT Filed: Aug. 20, 2018

(86) PCT No.: PCT/CN2018/101369
§ 371 (c)(1),
(2) Date: Mar. 1, 2019

(87) PCT Pub. No.: WO2019/144608
PCT Pub. Date: Aug. 1, 2019

(65) Prior Publication Data
US 2021/0365728 A1 Nov. 25, 2021

(30) Foreign Application Priority Data
Jan. 26, 2018 (CN) .......................... 201810079435.8

(51) Int. Cl.
G06K 9/62 (2006.01)
G06N 3/08 (2006.01)
G06N 3/04 (2006.01)

(52) U.S. Cl.
CPC ......... G06K 9/6256 (2013.01); G06K 9/6234 (2013.01); G06K 9/6298 (2013.01); G06N 3/0454 (2013.01); G06N 3/08 (2013.01)

(58) Field of Classification Search
CPC .. G06K 9/6256; G06K 9/6234; G06K 9/6298; G06N 3/0454
See application file for complete search history.

(56) References Cited

U.S. PATENT DOCUMENTS 10,311,547 B2* 6/2019 Michelini ............ G06N 3/0454
10,891,723 B1* 1/2021 Chung ................... G06N 20/00
(Continued)

FOREIGN PATENT DOCUMENTS

CN 105913450 A 8/2016
CN 106097355 A 11/2016
(Continued)

OTHER PUBLICATIONS

First Office Action dated Apr. 14, 2020 by the Chinese Patent Office in the corresponding Chinese application No. 201810079435.8.
(Continued)

Primary Examiner — Fayyaz Alam
(74) Attorney, Agent, or Firm — Dilworth & Barrese, LLP.; Michael J. Musella, Esq.

(57) ABSTRACT

An image processing method includes: obtaining an input image; and performing image conversion processing on the input image by using a generative neural network, to output a converted output image, wherein the generative neural network includes a plurality of processing levels, wherein an output result of an i-th processing level is inputted to an (i+1)-th processing level and a j-th processing level, the j-th processing level further receives an output result of a (j−1)-th processing level, the output result of the (j−1)-th processing level and the output result of the i-th processing level have the same size, wherein i is less than j−1, i and j are positive integers.

18 Claims, 7 Drawing Sheets

(56) References Cited

U.S. PATENT DOCUMENTS

| 10,991,074 | B2* | 4/2021 | Bousmalis | G06K 9/6259 |
|---|---|---|---|---|
| 2017/0142394 | A1 | 5/2017 | Peterson | |
| 2018/0144214 | A1* | 5/2018 | Hsieh | G06K 9/036 |
| 2019/0220746 | A1 | 7/2019 | Liu et al. | |
| 2020/0097767 | A1* | 3/2020 | Perry | G06K 9/00604 |

FOREIGN PATENT DOCUMENTS

| CN | 106886023 A | 6/2017 |
|---|---|---|
| CN | 107122826 A | 9/2017 |
| CN | 107133942 A | 9/2017 |
| CN | 107145902 A | 9/2017 |
| CN | 107256396 A | 10/2017 |
| CN | 107330852 A | 11/2017 |
| CN | 107369189 A | 11/2017 |
| CN | 107424184 A | 12/2017 |
| CN | 107547773 A | 1/2018 |

OTHER PUBLICATIONS

International Search Report and Written Opinion dated Oct. 24, 2018 from State Intellectual Property Office of the P.R. China.
Zhu et al., Unpaired Image-to-Image Translation Using Cycle-Consistent Adversarial Networks, Jun-Yan Zhu, Berkeley AI Research (BAIR) Laboratory, UC Berkeley, 2017, pp. 2223-2232.

* cited by examiner

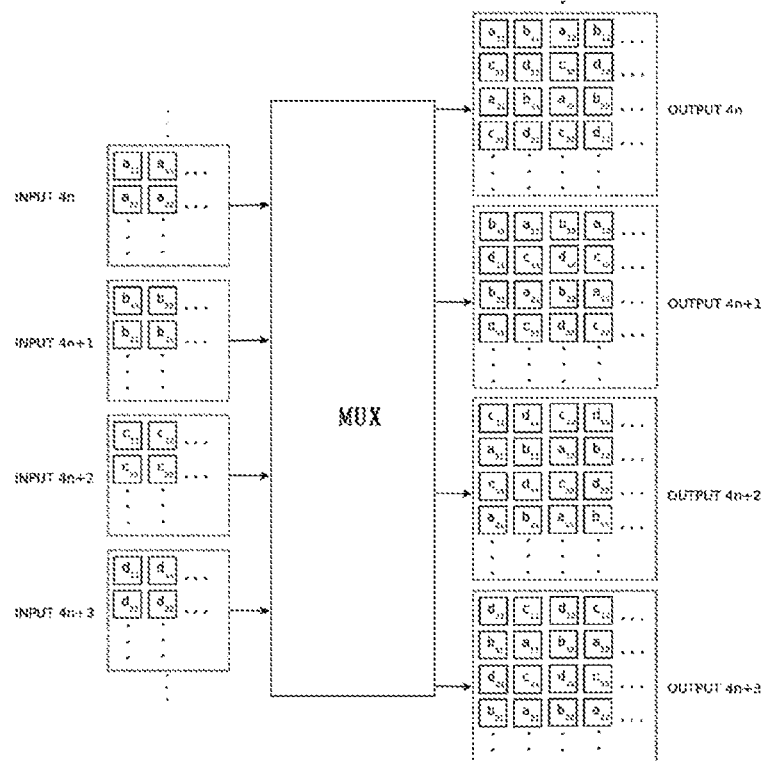

FIG. 3

```
┌─────────────────────────────────────┐
│    Obtaining a first training image │─── S410
└─────────────────────────────────────┘
                  ▼
┌─────────────────────────────────────────────┐
│ Generating, by the generative neural network,│─── S420
│ a first training output image from a first training image │
└─────────────────────────────────────────────┘
                  ▼
┌─────────────────────────────────────────────┐
│ Training the generative neural network based on the │─── S430
│ first training image and the first training output image │
└─────────────────────────────────────────────┘
```

FIG. 4

IMAGE PROCESSING METHOD, PROCESSING APPARATUS AND PROCESSING DEVICE

This application claims the priority of Chinese Patent Application No. 201810079435.8, filed on Jan. 26, 2018, which is hereby incorporated by reference in its entirety as a part of this application.

TECHNICAL FIELD

The present disclosure relates to the field of image processing, and more particularly to an image processing method, a processing apparatus and a processing device.

BACKGROUND

The use of deep neural network for image processing and conversion is a technique that has emerged with the development of deep learning technique. However, the image processing and conversion system in the prior art has complicated structure and is difficult to train. Accordingly, there is a need for an image processing method, a processing apparatus and a processing device for implementing image conversion, which can perform conversion processing on an input image while retaining raw information of the input image, thus ensuring consistency between the output image and the input image.

SUMMARY

An embodiment of the present disclosure provides an image processing method, comprising: obtaining an input image; and performing image conversion processing on the input image by using a generative neural network, to output a converted output image, wherein the generative neural network includes a plurality of processing levels, wherein an output result of an i-th processing level is inputted to an (i+1)-th processing level and a j-th processing level, the j-th processing level further receives an output result of a (j−1)-th processing level, the output result of the (j−1)-th processing level and the output result of the i-th processing level have the same size, wherein i is less than j−1, i and j are positive integers.

Exemplarily, each of the plurality of processing levels of the generative neural network includes a convolution network, and at least a portion of the plurality of processing levels further includes at least one of a downsampling layer, an upsampling layer and a normalizing layer.

Exemplarily, in the generative neural network, the number of the downsampling layers is equal to the number of the upsampling layers.

Exemplarily, the input image serves as a first training image, the output image serves as a first training output image, the image processing method further comprises: training the generative neural network based on the first training image and the first training output image.

Exemplarily, training the generative neural network comprises: inputting the first training output image to a discriminative neural network, and outputting a discriminative tag for whether the first training output image has a conversion feature; and calculating a loss value of the generative neural network according to the first training image, the first training output image and the discriminative tag and optimizing parameters of the generative neural network, by using a first loss calculation unit.

Exemplarily, the first loss calculation unit includes an analysis network, a first loss calculator and an optimizer, and optimizing parameters of the generative neural network by using a first loss calculation unit comprises: outputting, by using the analysis network, content features of the first training image and the first training output image; calculating, by using the first loss calculator, a loss value of the generative neural network according to content features outputted by the analysis network and the discriminative tag of the first training output image and in accordance with a first loss function; and optimizing, by using the optimizer, parameters of the generative neural network according to the loss value of the generative neural network, the parameters including convolution kernels and biases of the convolution networks in the generative neural network.

Exemplarily, the first loss function includes at least one of a content loss function, a generative neural network loss function and a normalizing loss function.

Exemplarily, the input image serves as a second training image, the output image serves as a first sample image, the image processing method further comprises: obtaining a second sample image from a training database; outputting, by using the discriminative neural network, discriminative tags for whether the first sample image and the second sample image have a conversion feature; and training, by using the second loss calculation unit, the discriminative neural network according to the discriminative tag of the first sample image and the discriminative tag of the second sample image.

Exemplarily, the second loss calculation unit includes a second loss calculator and an optimizer, and training the discriminative neural network by using the second loss calculation unit comprises: calculating, by using the second loss calculator, a loss value of the discriminative neural network according to the discriminative tag of the first sample image and the discriminative tag of the second sample image and in accordance with a second loss function, the second loss function including a discriminative neural network loss function; optimizing, by using the optimizer, parameters of the discriminative neural network according to the loss value of the discriminative neural network, the parameters including convolution kernels and biases of the convolution networks in the discriminative neural network.

Exemplarily, the training database includes sample images having a conversion feature.

An embodiment of the present disclosure further provides an image processing apparatus, comprising: a generative neural network module configured to perform image conversion processing on the input image to output a converted output image, wherein the generative neural network module includes a plurality of processing levels, wherein an output result of an i-th processing level is inputted to an (i+1)-th processing level and a j-th processing level, the j-th processing level further receives an output result of a (j−1)-th processing level, the output result of the (j−1)-th processing level has the same size as the output result of the i-th processing level, wherein i is less than j−1, i and j are positive integers.

Exemplarily, each of the plurality of processing levels of the generative neural network module includes a convolution network, and at least a portion of the plurality of processing levels further includes at least one of a downsampling layer, an upsampling layer and a normalizing layer, wherein in the generative neural network module, the number of the downsampling layers is equal to the number of the upsampling layers.

Exemplarily, the input image serves as a first training image, the output image serves as a first training output image, and the image processing apparatus further comprises: a training neural network module configured to train the generative neural network module according to the first training image and the first training output image, wherein the training generative neural network module comprises: a discriminative neural network module configured to output a discriminative tag for whether the first training output image has a conversion feature; and a first loss calculation unit configured to calculate a loss value of the generative neural network module according to the first training image, the first training output image and the discriminative tag, and optimize parameters of the generative neural network module.

Exemplarily, the first loss calculation unit comprises: an analysis network configured to output content features of the first training image and the first training output image; a first loss calculator configured to calculate a loss value of the generative neural network module according to the content features outputted by the analysis network and the discriminative tag of the first training output image and in accordance with a first loss function, wherein the first loss function includes at least one of a content loss function, a generative neural network loss function and a normalizing loss function; and an optimizer configured to optimize parameters of the generative neural network module according to the loss value of the generative neural network module, the parameters including convolution kernels and biases of the convolution networks in the generative neural network module.

Exemplarily, the training neural network module is further configured to train the discriminative neural network module according to the discriminative tag of the discriminative neural network module, wherein the input image serves as a second training image, the output image serves as a first sample image, an image obtained from a training database serves as a second sample image, and the discriminative neural network module outputs discriminative tags according to the first sample image and the second sample image, wherein the training neural network module further comprises: a second loss calculation unit configured to train the discriminative neural network module according to the discriminative tag of the first sample image and the discriminative tag of the second sample image.

Exemplarily, the second loss calculation unit comprises: a second loss calculator configured to calculate a loss value of the discriminative neural network module according to the discriminative tag of the first sample image and the discriminative tag of the second sample image and in accordance with a second loss function, the second loss function including a discriminative neural network module loss function; and an optimizer configured to optimize parameters of the discriminative neural network module according to the loss value of the discriminative neural network module, the parameters including convolution kernels and biases of the convolution networks in the discriminative neural network module.

Exemplarily, the training database includes sample images having a conversion feature.

An embodiment of the present disclosure further provides an image processing device, comprising: one or more processors; and one or more memories, wherein the memories store computer-readable codes, the image processing method as described above or the image processing apparatus as described above is implemented when the computer-readable codes are executed by the one or more processors.

BRIEF DESCRIPTION OF THE DRAWINGS

In order to more clearly illustrate the technical solutions in the embodiments of the present disclosure, drawings necessary for describing the embodiments will be briefly introduced below, obviously, the below described drawings are only related to some embodiments of the present disclosure and thus are not limitative of the present disclosure.

FIG. 3 shows a schematic diagram of a MUX layer;

FIG. 4 shows a flow chart of training the generative neural network;

DETAILED DESCRIPTION OF THE EMBODIMENTS

Hereinafter, the technical solutions in the embodiments of the present disclosure will be described clearly and comprehensively in combination with the drawings thereof, obviously, these described embodiments are only parts of the embodiments of the present disclosure, rather than all of the embodiments thereof, all the other embodiments obtained by those of ordinary skill in the art based on the embodiments of the present disclosure without paying creative efforts fall into the protection scope of the present disclosure.

Figure 1:
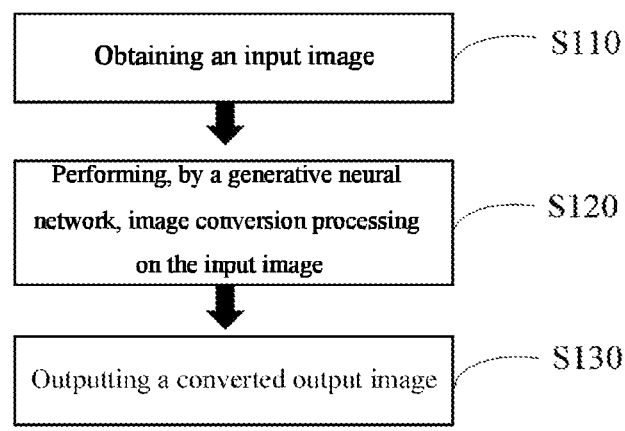
FIG. 1 shows a flowchart of an image processing method provided according to an embodiment of the present disclosure.

A flowchart of an image processing method provided according to an embodiment of the present disclosure is shown in FIG. 1.

In step S110, an input image to be subjected to image conversion processing is obtained, the input image is usually a chromatic image, and may be for example an RGB image or a grayscale image.

Next, in step S120, image conversion processing is performed on the input image by using a generative neural network, wherein the generative neural network is obtained based on training. Through training, the generative neural network can implement image feature conversion processing, which may be, but not limited to, an image style conversion, for example, making the inputted photo image have characteristics of oil painting, and may also be a seasonal feature conversion, for example, making the input image have characteristics of winter.

In the process of performing image conversion processing by using the generative neural network, due to the existence of downsampling processing, which is implemented for example by a pooling layer, in the neural network, raw image information will be lost in an outputted processing result and a redundant conversion feature will be generated, resulting in poor image conversion effect. In the present disclosure, by establishing cross-level connection between networks of different processing levels in the generative neural network, the generative neural network is made to maintain raw information of the input image during the image conversion processing, so that the outputted converted image not only includes the conversion feature, but also can retain the raw image information, thereby ensuring image conversion effect.

The cross-level connection refers to that an output result of an i-th processing level is inputted to both an (i+1)-th processing level and a j-th processing level, the j-th processing level further receives an output result of a (j−1)-th processing level, wherein the output result of the (j−1)-th processing level and the output result of the i-th processing level have the same size, wherein i is less than j−1, i and j are positive integers. Thus, cross-level connection is established between the i-th processing level and the j-th processing level, wherein the output result of the i-th processing level strides processing steps of its subsequent processing levels and is directly inputted to the j-th processing level, the j-th processing level performs image processing based on the output result of the i-th processing level and the output result of the (j−1)-th processing level. The generative neural network connects, in a cross-level way, the output result of the i-th processing level to the input of the j-th processing level, since the output result of the i-th processing level is not processed by the processing levels between the i-th processing level and the j-th processing level, the output result of the i-th processing level contains more raw information of the input image as compared with the output result of the (j−1)-th processing level, thereby ensuring consistency of the output image and the input image.

Next, in step S130, the generative neural network outputs an output image that has been subjected to image conversion processing, the output image has an image conversion feature. The generative neural network can implement different image conversion processing through different training procedures, which may for example be image conversion of image style, scene, season, effect or image conversion based on other features.

Figure 2A:
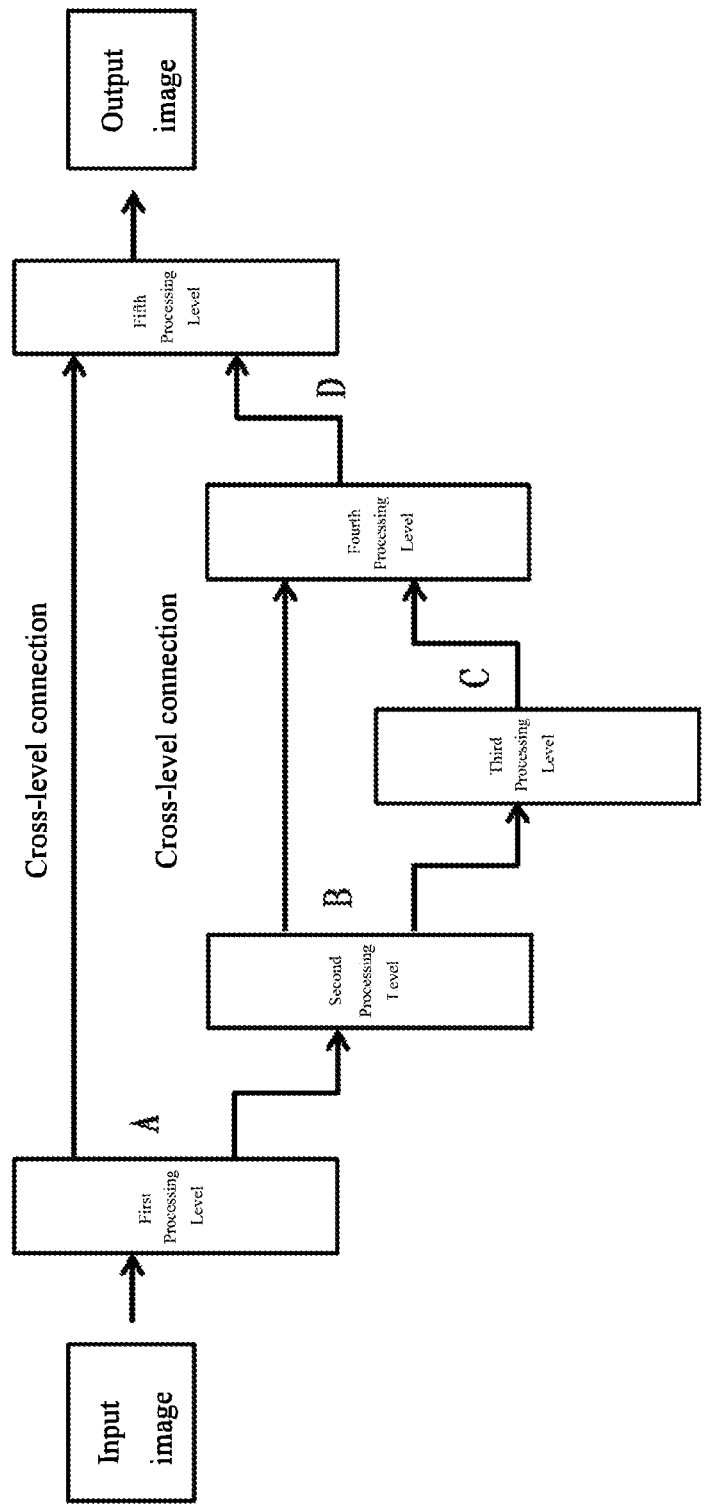
FIG. 2A shows a structural block diagram of a generative neural network for implementing the image processing method in FIG. 1.

FIG. 2A shows a structural block diagram of a generative neural network for implementing the image processing method described above, FIG. 2B shows a specific structure of a generative neural network for implementing the image processing method as described above. Hereinafter, the image processing method will be described in detail with reference to FIGS. 2A and 2B.

Figure 2B:
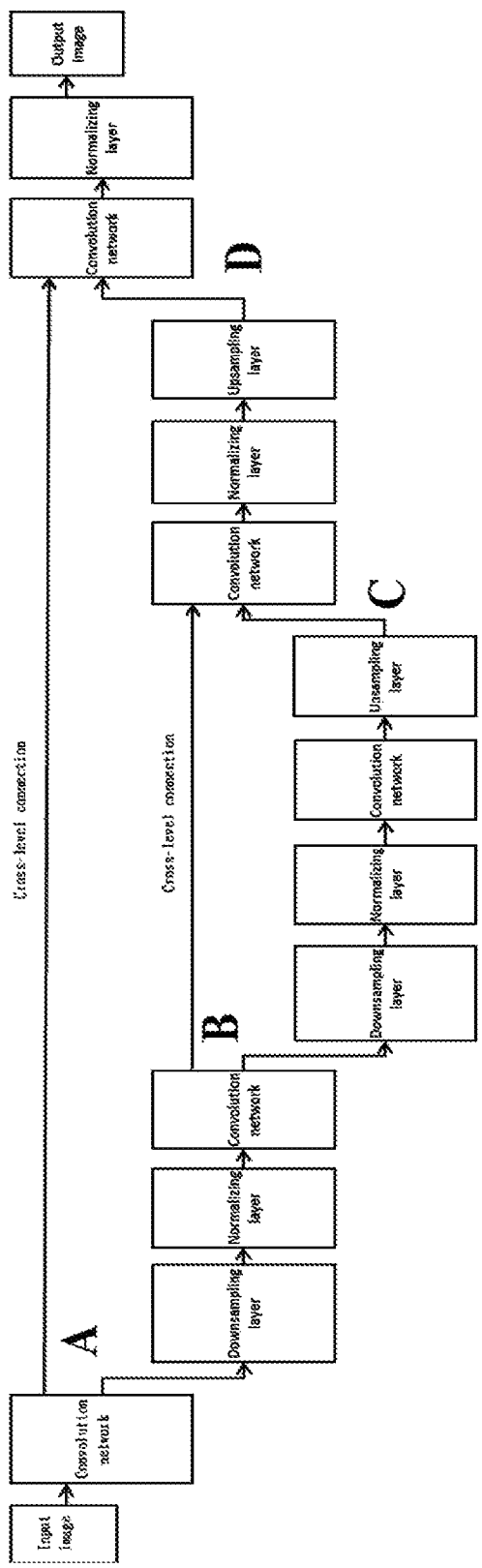
FIG. 2B shows a specific structure of a generative neural network for implementing the image processing method in FIG. 1.

The generative neural network shown in FIGS. 2A and 2B is a neural network including five processing levels, wherein each processing level includes a convolution network. At least a portion of the processing levels among the five processing levels may further include at least one of a downsampling layer, an upsampling layer and a normalizing layer, as needed for image processing. In the generative neural network, the number of the downsampling layers and the number of the upsampling layers are equal. It should be noted that the generative neural network in FIGS. 2A and 2B is merely exemplary and does not constitute a limitation to the present disclosure. The generative neural network for implementing image conversion processing may have other numbers of processing levels, and its specific structure may be appropriately adjusted according to the needs of image conversion.

The convolution network includes at least a convolution layer, and may further include other processing layers, such as a pooling layer, an activation layer and the like. Typically, each convolution layer may contain tens or hundreds of convolution kernels, the more layers there are, the more complex the structure of the convolution network is.

In the embodiment of the present disclosure, each of the plurality of processing levels in the generative neural network includes a convolution network for implementing image conversion processing. At least a portion of the plurality of processing levels further includes at least one of a downsampling layer, an upsampling layer and a normalizing layer. The generative neural network also includes cross-level connection. The cross-level connection is used to connect two parts of networks at different processing levels as shown in FIGS. 2A and 2B.

As shown in FIG. 2A, after inputting the input image to the generative neural network, processing of the first processing level is first performed for extracting image features, and for the convenience of description, a result after being processed by the first processing level is represented as Result A.

Next, Result A is processed by the second processing level in the generative neural network to obtain Result B. Next, Result B is processed by the third processing level in the generative neural network to obtain Result C. Next, Result C is processed by the fourth processing level in the generative neural network to obtain Result D. Next, Result D is processed by the fifth processing level in the generative neural network to obtain an output image.

On the basis of this, Result A obtained from processing of the first processing level is connected cross-level to the fifth processing level for being subjected to processing of the fifth processing level together with Result D, so as to generate an output image. The cross-level connection is that Result A of the first processing level strides processing of the second, third and fourth processing levels. Herein, the image in Result A has the same size as the image in Result D. In addition, since Result A is not processed by the second, third and fourth processing levels, it includes more raw information of the input image than Result D, so that the output image can retain more information of the input image based on image feature conversion, so as to maintain consistency with the input image.

Similarly, Result B obtained after passing through the first and second processing levels is connected cross-level to the fourth processing level for being subjected to processing of the fourth processing level together with Result C for generating Result D. That is, Result B of the second processing level is directly inputted to the fourth processing level, striding processing of the third processing level. The image in Result B has the same size as the image in Result C. The fourth processing level generates Result D based on Result B and Result C, wherein Result C is obtained by subjecting Result B to processing of the third processing level, and since Result B is not processed by the third processing level, Result B contains more raw information of the input image than Result C.

In other embodiment according to the present disclosure, the generative neural network may also be a network including more processing levels, the cross-level connection may be sequentially implemented according to the order of the processing levels in the neural network, no more detailed are repeated herein.

As shown in FIG. 2B, in the embodiment of the present disclosure, the first processing level in the generative neural network may include a convolution network for extracting image features in the input image to obtain Result A. The second processing level may include a downsampling layer, a normalizing layer and a convolution network in sequence for obtaining Result B. The third processing level may include a downsampling layer, a normalizing layer, a convolution network and an upsampling layer in sequence for obtaining Result C. The fourth processing level may include a convolution network, a normalizing layer and an upsampling layer in sequence for obtaining Result D. The fifth processing level may include a convolution network and a normalizing layer in sequence for generating an output image. The generative neural network also establishes cross-level connection between different processing levels. Specifically, cross-level connection is established between the output result of the first processing level and the input of the fifth processing level, that is, Result A is inputted to both the second processing level and the fifth processing level, thereby the fifth processing level receives both Result D and Result A. Furthermore, cross-level connection is also established between the output result of the second processing level and the input of the fourth processing level, i.e., Result B is inputted to both the third processing level and the fourth processing level, thereby the fourth processing level receives both Result C and Result B.

Specifically, in the generative neural network, a convolution network for image conversion processing includes a number of convolution layers. In the convolution layer, one neuron is only connected to neurons of parts of adjacent layers, and the convolution layer can apply a number of convolution kernels to the inputted image to extract multiple types of features. Each convolution kernel can extract one type of feature, in the process of training the generative neural network; the convolution kernel can achieve a reasonable weight by learning. The result obtained by applying a convolution kernel to the input image is referred to as a feature image, the number of which is the same as the number of convolution kernel.

The downsampling layer may down sample the image (which may for example be a pooling layer), reduce a size of the feature images without changing the number of feature images, perform feature compression, and extract main features. In addition, the downsampling layer can reduce the size of the feature images to simplify the computational complexity and reduce the over-fitting phenomenon to some extent.

The normalizing layer is for normalizing the feature image outputted by an upper level. In the embodiment of the present disclosure, the normalizing layer normalizes the mean and variance of each feature image. It is assumed that the number of selected feature images (mini-batch) is T, the number of features outputted by the convolution layer is C, each feature image is a matrix of H rows and W columns, the feature image is represented as (T, C, W, H), then the normalizing formula is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H} x_{tilm},$$

$$\sigma_{ti}^2 = \frac{1}{HW}\sum_{l=1}^{W}\sum_{m=1}^{H}(x_{tilm} - m\mu_{ti})^2$$

where $x_{tijk}$ is the value in the k-th row and the j-th column in the i-th feature image of the t-th feature block (patch) in the feature image set outputted by a certain convolution layer, $y_{tijk}$ represents the result of subjecting $x_{tijk}$ to processing of the instance normalizing layer, ε is an integer with a small value to avoid the denominator being 0.

The upsampling layer may for example be a MUX layer that can perform pixel interleaving rearrangement processing on the inputted several images, such that the size of each image is increased without changing the number of images. Thus, the MUX layer increases the number of pixels of each image by arranging and combining pixels between different images. FIG. 3 shows a schematic diagram of upsampling by using a 2*2 MUX layer. For the inputted four images INPUT 4n, INPUT 4n+1, INPUT 4n+2 and INPUT 4n+3, it is assumed that the number of pixels of the input image is a*b, after pixel rearrangement processing of the 2*2 MUX layer, four images with the pixel number of 2a*2b, OUTPUT 4n, OUTPUT 4n+1, OUTPUT 4n+2 and OUTPUT 4n+3 are outputted, pixel information for each image is added. In the embodiment of the present disclosure, the number of the upsampling layers should be the same as the number of the downsampling layers, so that the output image has the same image size as the input image, and the two parts of processing results of the cross-level connection is guaranteed to have the same image size.

The conversion feature of the output image is determined by parameters of the generative neural network, the parameters are optimized by training the generative neural network according to an image conversion application, so as to achieve the conversion purpose, so that the output image has the same image feature as the training image. The parameters may include convolution kernels and biases of the convolution networks in the generative neural network, the convolution kernels and the biases can determine enabling conditions of the results for cross-level connection (e.g., Result A and Result B), for example, a contribution degree made by Result A and Result D to the generated output image during the procedure of being processed by the fifth processing level is determined through the convolution kernel and the bias, so as to control the cross-level connection.

For example, in the generative neural network in FIG. 2B, by means of adjusting the convolution kernel and the bias, Result A for cross-level connection can have a larger weight than Result D in the process of generating the output image, so that the output image has more raw information. Similarly, by means of adjusting the convolution kernel and the bias, Result A for cross-level connection can have a smaller weight than Result D in the process of generating the output image. Thus, the cross-level connection enables the generative neural network to have more flexibility during the image conversion processing. Herein, the image conversion may be conversion of image style, season, effect, scene etc., for example, converting a landscape image into an image with Van Gogh works features, converting an image with summer features into an image with winter features, converting an image of brown horse to having zebra features etc., even an image of a cat can be converted into an image of a dog.

Figure 5:
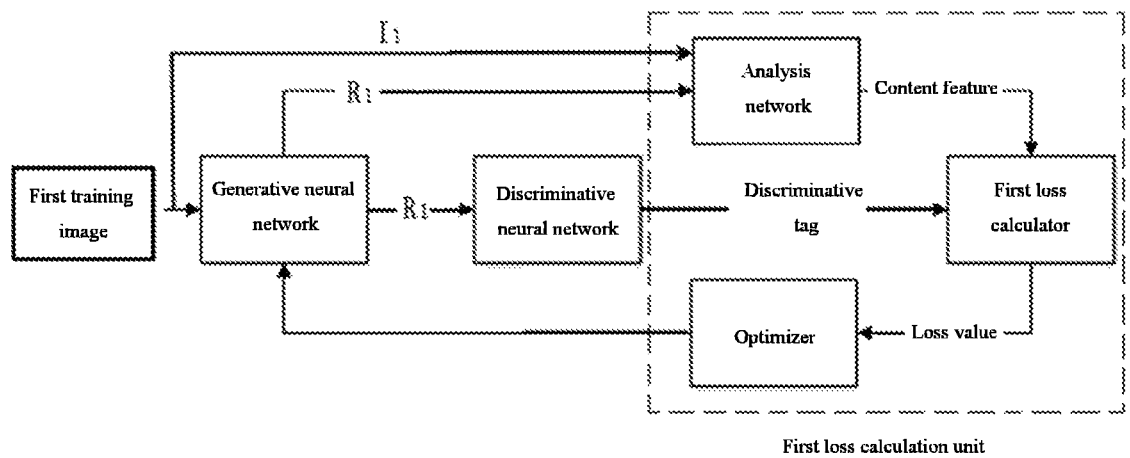
FIG. 5 shows a block diagram of training the generative neural network.

FIG. 4 shows a flow chart of training the generative neural network, FIG. 5 shows a block diagram of training the generative neural network. Hereinafter, the process of training the generative neural network will be described in detail in conjunction with FIGS. 4 and 5.

In the image processing method according to the embodiment of the present disclosure, as shown in FIG. 4, in step S410, a first training image is obtained. The first training image may be the same as or different from the input image shown in FIG. 1, it is used to train the generative neural network and does not have a desired image conversion feature.

Next, in step S420, the first training image is subjected to image conversion processing by using the generative neural network to generate a first training output image. This process is the same as the step of generating an output image by using the generative neural network in FIG. 1, and details are not repeated herein again.

Then, in step S430, the generative neural network is trained based on the first training image and the first training output image, the training is to optimize parameters in the network according to the processing result of the generative neural network, so that the output image has a desired image conversion feature. The desired image conversion feature refers to it is desired that an output image having the conversion feature is obtained from an input image that does not have the conversion feature through an image conversion processing as implemented by the generative neural network. For example, the desired image conversion feature may be a feature of Van Gogh paintings, and the first training image is a photo that does not have the feature of Van Gogh paintings, the first training output image is generated by using the generative neural network, and parameters in the neural network are trained by determining whether the first training output image outputted by the generative neural network has the feature of Van Gogh paintings.

As shown in FIG. 5, the specific process of training the neural network in step S430 comprises: inputting the first training output image to a discriminative neural network, and outputting a discriminative tag for whether the first training output image has a conversion feature; and calculating a loss value of the generative neural network according to the first training image, the first training output image and the discriminative tag, and optimizing parameters of the generative neural network, by using a first loss calculation unit.

As shown in FIG. 5, the first loss calculation unit includes an analysis network, a first loss calculator and an optimizer. In the embodiment of the present disclosure, calculating the loss value of the generative neural network by using the first loss calculation unit includes: outputting, by using the analysis network, content features of the first training image and the first training output image; calculating, by using the first loss calculator, a loss value of the generative neural network according to content features outputted by the analysis network and the discriminative tag of the first training output image and in accordance with a first loss function; optimizing, by the optimizer, parameters of the generative neural network according to the loss value of the generative neural network, wherein the parameters include convolution kernels and biases of the convolution networks in the generative neural network.

Figure 6:
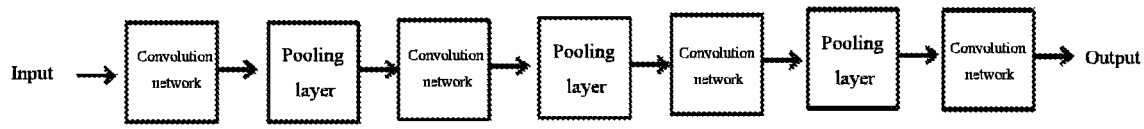
FIG. 6 shows a specific structural diagram of an analysis network.

The specific structure of the analysis network is as shown in FIG. 6, which is composed of several convolution networks and a pooling layer, and used for extracting content features of the input image. The outputs of each convolution network are features extracted from the input image, and the pooling layer is used to reduce a resolution of the feature image and pass it to the next convolution network. The feature image processed by each convolution network characterizes the feature (such as texture, edge, object etc.) of the input image at different levels.

In the embodiment of the present disclosure, the first training image $I_1$ and the first training output image $R_1$ are processed by using the analysis network, content features thereof are extracted, and extracted content features are inputted to the first loss calculator.

The first loss calculator calculates a loss value of the generative neural network according to the content features of the first training image $I_1$ and the first training output image $R_1$ as outputted by the analysis network and the discriminative tag and in accordance with a first loss function. The first loss calculator inputs a calculated total loss value of the generative neural network to the optimizer, the optimizer optimizes convolution kernels and biases of the convolution networks in the generative neural network according to the loss value, so as to achieve the processing effect more close to the image conversion feature. The convolution kernel and the bias can determine enabling conditions of the results (e.g., Result A and Result B) for cross-level connection. Accordingly, system flexibility during the training process is increased, and the trained generative neural network including the cross-level connection can make the output image preserve raw information of the input image on the basis of having a desired conversion feature, thereby avoiding inconsistency between the converted image and the input image.

In the embodiment of the present disclosure, the first loss function includes at least one of a content loss function, a generative neural network loss function and a normalizing loss function. The content loss function is used to represent a content loss between the first training image $I_1$ and the first training output image $R_1$, let $P^l$ and $F^l$ be the feature images outputted for them from the l-th level in the analysis network, definition of the content loss function is as follows:

$$L_{content} = \frac{1}{2C1} \sum_{ij} (F_{ij}^l - P_{ij}^l)^2$$

where C1 is a constant used to normalize the result, $F_{ij}^l$ represents the value of the j-th position in $F^l$ outputted by the i-th convolution kernel in the l-th convolution layer in the analysis network, $P_{ij}^l$ represents the value of the j-th position in $P^l$ outputted by the i-th convolution kernel in the l-th convolution layer.

By the formula of the content loss function, the content loss value $L_{content\_1}$ between the first training output image $R_1$ processed by the generative neural network and the first training image $I_1$ can be calculated according to the feature images respectively outputted for the first training image $I_1$ and the first training output image $R_1$ in the analysis network.

By calculating the content loss value of the generative neural network, it can be ensured that the converted image outputted thereby is consistent with the input image, so that the output image retains sufficient raw information on the basis of having the conversion feature after being processed. In the embodiment of the present disclosure, the generative neural network is trained by using the discriminative neural network and combined with the content loss function, so as to ensure consistency between the converted image and the input image, so that the system is simple and easy to train.

In the embodiment of the present disclosure, the generative neural network loss function is expressed as:

$$L\_G = E_{x \sim Pdata(x)}[\log D(x)] + E_{z \sim Pz(z)}[1 - \log D(G(z))]$$

where E is an averaging process, Pdata is a set of images that cause the output of the discriminative neural network to be 1, that is, training images having a target conversion feature, and x is an image belonging to the set Pdata, for example, a second sample image. Pz is a set of input images of the generative neural network, and z is an image belonging to the set Pz, for example, a first training image. D is the discriminative neural network, G is the generative neural network, D(x) represents subjecting the image x to processing of the discriminative neural network, and outputting a discriminative tag of the image x by using the discriminative neural network. G(z) represents subjecting the image z to processing of the generative neural network and generating the output image, and D(G(z)) is subjecting the output image processed by the generative neural network to the discriminative neural network, outputting a discriminative tag for whether the output image has a conversion feature. The first loss calculator calculates a loss value of the generative neural network based on the L_G.

In the embodiment of the present disclosure, the normalizing loss function adopts a parameter regularizing loss function $L_{L1}$, and other types of normalizing loss function may also be adopted. In the neural network, the convolution kernel and the bias are both parameters that need to be obtained by training. The convolution kernel determines how the inputted image is processed, and the bias determines whether the output of the convolution kernel is to be inputted to the next layer. Thus, in the neural network, the bias can be visually compared to a "switch" that determines whether the convolution kernel is "on" or "off". For different input images, the network turns on or off different convolution kernels to achieve different processing effects.

The mean value of the absolute values of all convolution kernels in the neural network is:

$$W = \frac{\sum \|w\|}{C_w}$$

where $\Sigma\|w\|$ refers to summing the values of all convolution kernels in the network, $C_w$ is the number of convolution kernels in the network.

The mean value of all biases absolute values in the neural network is:

$$B = \frac{\sum \|b\|}{C_b}$$

where $\Sigma\|b\|$ refers to summing the values of all the biases in the network, $C_b$ is the number of biases in the network.

Then the parameter regularizing loss function is:

$$L_{L1} = \frac{W}{B + \varepsilon}$$

where $\varepsilon$ is a very small positive number used to ensure that the denominator is not zero.

In the embodiment of the present disclosure, it is desired that the bias in the convolution layer has a greater absolute value than the convolution kernel, so as to more effectively achieve the "switch" function of the bias. During the training, the first loss calculator calculates a parameter regularizing loss value of the generative neural network according to the $L_{L1}$.

In summary, a total loss of the generative neural network is:

$$L_{total} = \alpha L_{content} + \beta L\_G + \chi R$$

where R is the normalizing loss value of the generative neural network, and $\alpha$, $\beta$, $\chi$ are weights occupied respectively by the content loss value, the generative neural network loss value and normalizing loss value in the total loss. In the embodiment of the present disclosure, the parameter regularizing loss value described above is used to represent the normalizing loss value, other types of normalizing loss values can also be used.

Figure 7:
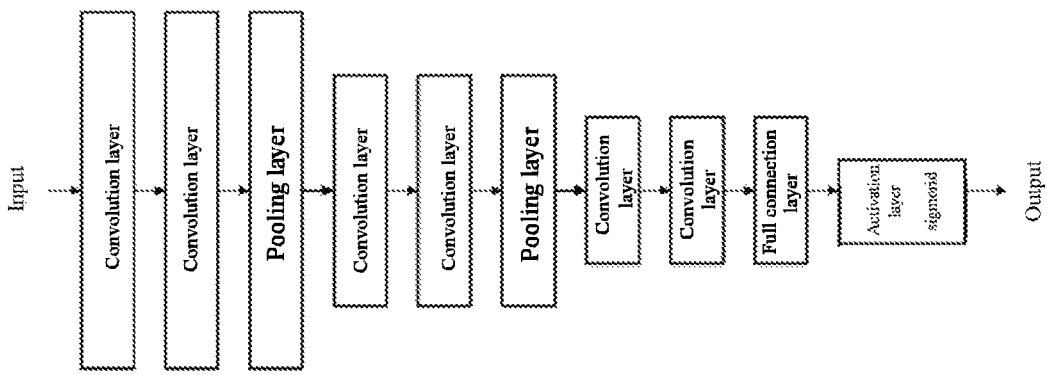
FIG. 7 shows a specific structural diagram of a discriminative neural network.

The discriminative neural network used in the process of training the generative neural network, together with the generative neural network constitute a set of confrontation networks. The discriminative neural network extracts content features of the input image by using a plurality of convolution layers and pooling layers, and reduces the size of the feature image, for further extraction of image features by the next convolution layer. The image features are then processed using the full connection layer and the activation layer, and finally a discriminative tag indicating whether the input image has a conversion feature is outputted. The full connection layer has the same structure as the convolution neural network except that the convolution kernel is replaced with a scalar value. The activation layer is typically a RELU or sigmoid function. In the embodiment of the present disclosure, the specific structure of the discriminative neural network is as shown in FIG. 7, wherein the activation layer is a sigmoid function, and the discriminative tag is outputted finally.

In the confrontation networks, the generative neural network converts the input image having an effect M into an output image having an effect N, the discriminative neural network determines whether the output image has the feature of the effect N and outputs the discriminative tag. For example, if it is determined that the output image has the feature of the effect N, then the output is close to "1", and if it is determined that the output image does not have the feature of the effect N, then the output is close to "0". Through training, the generative neural network gradually generates an output image that causes the discriminative neural network to output "1", and gradually the discriminative neural network can more accurately determine whether the output image has a conversion feature. The generative neural network and the discriminative neural network are trained synchronously and confront against each other to obtain better parameters.

Figure 8:
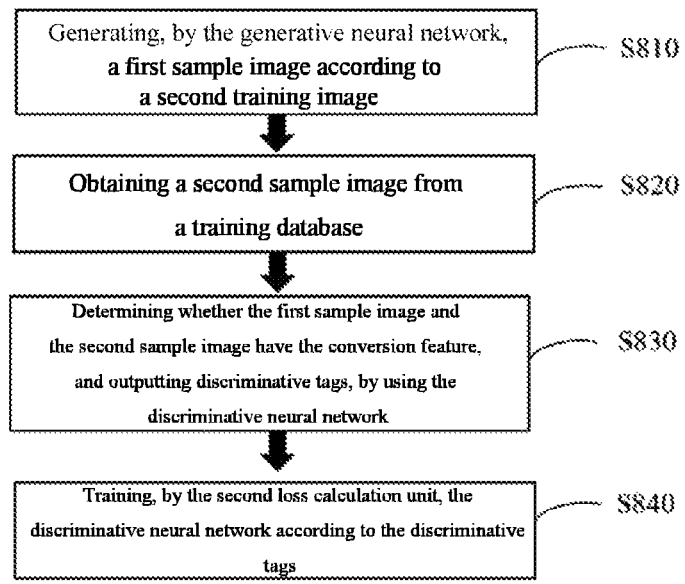
FIG. 8 shows a flow chart of training the discriminative neural network.
Figure 9:
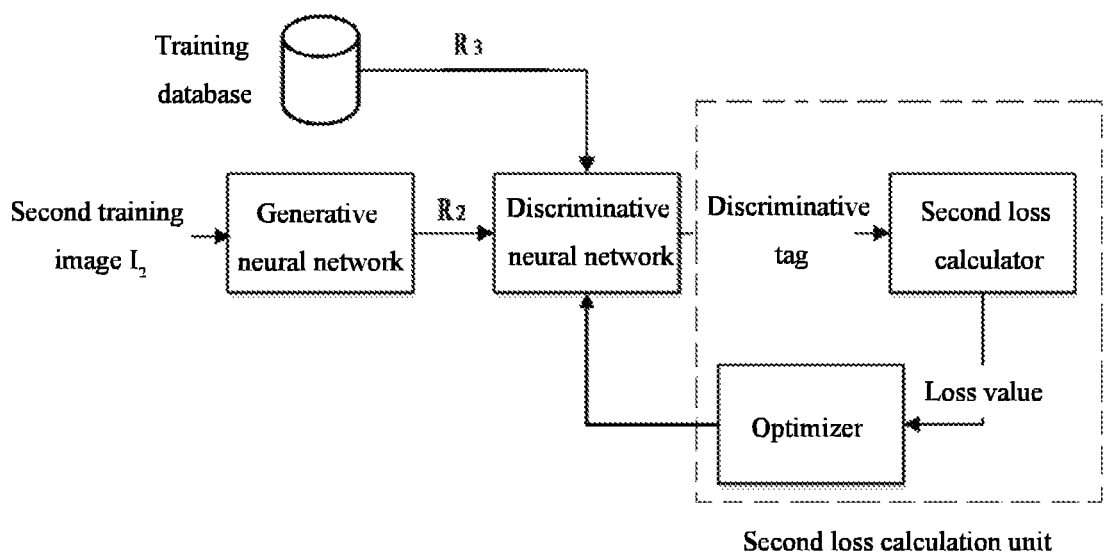
FIG. 9 shows a block diagram of training the discriminative neural network.

FIG. 8 shows a flow chart of training the discriminative neural network, FIG. 9 shows a block diagram of training the discriminative neural network. Next, the process of training the discriminative neural network will be described in detail with reference to FIGS. 8 and 9.

As shown in FIG. 8, in step S810, a first sample image $R_2$ is generated by using the generative neural network according to a second training image $I_2$, and the second training image $I_2$ may be the same as or different from the input image shown in FIG. 1, it is used to train the discriminative neural network and does not have a desired image conversion feature. This process is the same as the step of generating the output image according to the input image by using the generative neural network in FIG. 1, and details will not repeated herein again.

Next, in step S820, a second sample image $R_3$ is obtained from a training database, the second sample image contains the desired image conversion feature. The sample image in the training database contains the desired conversion feature, for example, it may be a set of Van Gogh paintings, all of which have similar features in creation, color, composition etc., so that the trained generative neural network can convert the input image into an output image with the same feature.

In step S830, the above-described discriminative neural network is used to determine whether the first sample image $R_2$ and the second sample image $R_3$ have the conversion feature, and output discriminative tags. It should be understood that the second sample image $R_3$ serves as a "true sample" because it has a "true" tag naturally, and the first sample image $R_2$ serves as a "fake" tag because it is generated by the generative neural network and naturally has a "fake" tag.

Last, in step S840, the discriminative neural network is trained according to the discriminative tags by using the second loss calculation unit.

As shown in FIG. 9, the second loss calculation unit includes a second loss calculator and an optimizer. In the image processing method, the second loss calculator is used to calculate a loss value of the discriminative neural network according to the discriminative tag of the first sample image and the discriminative tag of the second sample image and in accordance with a second loss function, wherein the second loss function is a discriminative neural network loss function; the optimizer is used to optimize parameters of the discriminative neural network according to the loss value of the discriminative neural network, wherein the parameters include convolution kernels and biases of the convolution networks in the discriminative neural network.

The first sample image $R_2$ is an output image obtained by converting the effect M to the effect N by using the generative neural network, and is equivalent to a "false" sample. The second sample image $R_3$ obtained from the training database is a "true" sample with the effect N. The discriminative neural network is used to determine whether the $R_2$ and $R_3$ have the effect N, and output discriminative tags.

The second loss function includes the discriminative neural network loss function:

$$L\_D = -E_{x \sim Pdata(x)}[\log D(x)] - E_{z \sim Pz(z)}[1 - \log D(G(z))]$$

where E is an averaging process, Pdata is a set of images that cause output of the discriminative neural network to be 1, that is, training images having a target conversion feature, and x is an image belonging to the set Pdata, for example, a second sample image. Pz is a set of input images of the generative neural network, z is an image belonging to the set Pz, for example, a first training image. D is the discriminative neural network, G is the generative neural network, wherein D(x) represents subjecting the image x to processing of the discriminative neural network, a discriminative tag of the image x is outputted by using the discriminative neural network. G(z) represents subjecting the image z to processing of the generative neural network, that is, the generative neural network is used to generate the output image according to the image x, and D(G(z)) represents subjecting the output image processed by the generative neural network to processing of the discriminative neural network, and outputting a discriminative tag for whether the output image has a conversion feature. A loss value of the discriminative neural network is calculated by the second loss calculator based on the L_D, and parameters of the discriminative neural network are optimized according to the loss value by using the optimizer, the parameters include convolution kernels and biases of the convolution networks in the discriminative neural network.

The trained neural generative network has optimized parameters that can be used to implement image conversion processing, and uses the input image to generate the output image having the desired conversion feature. The trained discriminative neural network has optimized parameters that can be used to determine whether the input image has the desired conversion feature.

In the present disclosure, the loss calculation unit is used to train the generative neural network and the discriminative neural network according to the loss functions, the system is simple and easier to train. Moreover, by establishing cross-level connection between different processing levels in the generative neural network, the output converted image is guaranteed to be consistent with the input image, that is, the converted image has both the conversion feature and sufficient raw image information, avoid losing a lot of raw image information during image processing.

Figure 10:
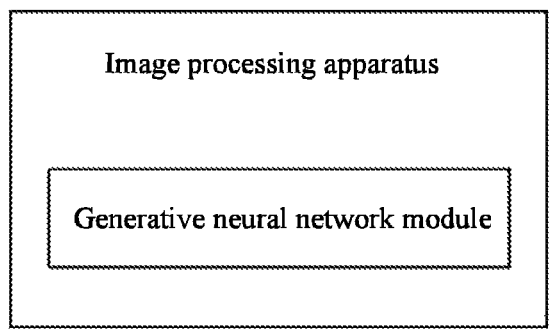
FIG. 10 is a schematic block diagram of an image processing apparatus provided according to an embodiment of the present disclosure.

An embodiment of the present disclosure also provides an image processing apparatus that can implement the image processing method described above. A schematic block diagram of the image processing apparatus is shown in FIG. 10, which includes a generative neural network module. It should be noted that structure of the image processing apparatus shown in FIG. 10 is merely exemplary, not limiting, and the image processing apparatus may have other components depending on actual application requirements.

The generative neural network module may comprise the generative neural network as described above. The image processing apparatus provided according to the embodiment of the present disclosure performs image conversion processing on the input image by using the generative neural network module to output the converted output image. The image processing apparatus may further comprise a training neural network module, the training neural network module is configured to train the generative neural network module based on the first training image and the first training output image of the generative neural network module, so that the output image has a desired image feature.

In the generative neural network module, by establishing cross-level connection between networks of different processing levels in the generative neural network, the generative neural network module maintains raw information of the input image during the image conversion processing, so that the outputted conversion image not only includes the conversion feature, but also can retain the raw image information, so as to ensure image conversion effect.

Each processing level in the generative neural network module may include at least a part of a convolution network, a downsampling layer, an upsampling layer and a normalizing layer according to the needs of image processing. In the generative neural network, the number of the downsampling layer and the number of the upsampling layer are equal. In the embodiment of the present disclosure, the generative neural network module performs image conversion processing on the input image to output an output image with the desired conversion feature.

The training neural network module is configured to train the generative neural network module according to the first training image and the first training output image. The generative neural network module outputs the image-converted first training output image $R_1$ according to the first training image $I_1$, and the training neural network module trains the generative neural network module based on the first training image $I_1$ and the first training output image $R_1$. The training is to optimize parameters in the network according to the processing result of the generative neural network, so that it can complete a desired image conversion processing.

In an embodiment of the present disclosure, the training neural network module includes a discriminative neural network module and a first loss calculation unit, and the discriminative neural network module includes the discriminative neural network described above. The discriminative neural network module is configured to output a discriminative tag for whether the first training output image $R_1$ has a conversion feature. The first loss calculation unit is configured to calculate a loss value of the generative neural network module according to the first training image $I_1$, the first training output image $R_1$ and the discriminative tag, and optimize parameters of the generative neural network module.

The first loss calculation unit includes an analysis network, a first loss calculator and an optimizer. The analysis network is configured to output content features of the first training image $I_1$ and the first training output image $R_1$. The first loss calculator is configured to calculate a loss value of the generative neural network according to content features outputted by the analysis network and the discriminative tag of the first training output image $R_1$ and in accordance with a first loss function, wherein the first loss function includes at least one of a content loss function, a generative neural network loss function and a normalizing loss function. The optimizer is configured to optimize parameters of the generative neural network according to the loss value of the generative neural network, wherein the parameters include convolution kernels and biases of the convolution networks in the generative neural network, the convolution kernel and the bias can determine enabling conditions of cross-level connection in the neural network.

According to the embodiment of the present disclosure, the training neural network module in the image processing apparatus described above is further configured to train the discriminative neural network module according to the discriminative tag of the discriminative neural network module. The above input image serves as the second training image $I_2$, the output image serves as the first sample image $R_2$, and the training image in the training database serves as the second sample image $R_3$. The discriminative neural network module outputs the discriminative tags of the first sample image $R_2$ and the second sample image $R_3$, respectively. The training neural network module further includes a second loss calculation unit configured to train the discriminative neural network module according to the discriminative tag of the first sample image $R_2$ and the discriminative tag of the second sample image $R_3$.

The second loss calculation unit includes a second loss calculator and an optimizer. The second loss calculation unit is configured to calculate a loss value of the discriminative neural network according to the discriminative tag of the first sample image $R_2$ and the discriminative tag of the second sample image $R_3$ and in accordance with a second loss function, wherein the second loss function is a loss function of the discriminative neural network in the neural network module. The optimizer is configured to optimize parameters of the discriminative neural network based on the loss value of the discriminative neural network, wherein the parameters include convolution kernels and biases of the convolution networks in the discriminative neural network.

The trained generative neural network module may perform image conversion processing according to training, so as to generate an output image capable of causing the output of the discriminative neural network module to be "1", that is, the discriminative neural network module determines that the output image has a conversion feature. The trained discriminative neural network module can, by the training, more accurately determine whether the output image outputted by the generative neural network module has the conversion feature.

The image processing apparatus provided according to the embodiment of the present disclosure includes a generative neural network module that establishes cross-level connection between different processing levels. The generative neural network module is trained according to the image in the training database and the loss function, by means of optimizing the parameters in the neural network, the trained generative neural network module can output the output image with the desired conversion feature while retaining the raw information in the input image, which ensures that the output image remains consistent with the input image, the system is simple, easy to train, and has greater flexibility.

Figure 11:
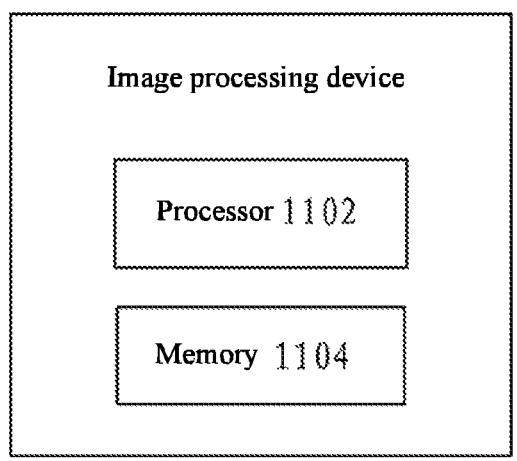
FIG. 11 is a schematic block diagram of an image processing device provided according to an embodiment of the present disclosure.

An embodiment of the present disclosure further provides an image processing device, whose structural block diagram is shown in FIG. 11, it includes a processor 1102 and a memory 1104. It should be noted that structure of the image processing device shown in FIG. 11 is merely exemplary and not restrictive, the image processing device may have other components depending on actual application needs.

In an embodiment of the present disclosure, the processor 1102 and the memory 1104 can communicate with each other directly or indirectly. Communication between components such as the processor 1102 and the memory 1104 can be made through a network connection. The network may include a wireless network, a wired network, and/or any combination of a wireless network and a wired network. The network may include a local area network, the Internet, a telecommunications network, an Internet of Things based on Internet and/or telecommunications network, and/or any combination of the above networks, and the like. The wired network can communicate by means of for example twisted pair, coaxial cable or optical fiber transmission, the wireless communication network may for example adopt 3G/4G/5G mobile communication network, Bluetooth, Zigbee or Wi-Fi. The present disclosure does not limit the type and function of the network.

The processor 1102 can control other components in the image processing device to perform the desired functions. The processor 1102 may be devices having data processing capability and/or program execution capability, such as a central processing unit (CPU), a tensor processing unit (TPU) or a graphics processor GPU etc. The central processing unit (CPU) may be an X86 or ARM architecture or the like. The GPU may be integrated directly into the motherboard or built into the Northbridge of the motherboard. The GPU may also be built into the central processing unit (CPU), because the GPU has powerful image processing capability.

The memory 1104 may include any combination of one or more computer program products, which can include various forms of computer-readable storage medium, such as volatile memory and/or nonvolatile memory. The volatile memory may for example include random access memory (RAM) and/or caches and the like. The non-volatile memory may for example include read only memory (ROM), hard disk, erasable programmable read only memory (EPROM), portable compact disk read only memory (CD-ROM), USB memory, flash memory, and the like.

One or more computer-readable codes or instructions may be stored on the memory 1104, and the processor 1102 can execute the computer instructions to perform the image processing method described above or to implement the image processing apparatus described above. For detailed description of the image processing method and the image processing apparatus, reference may be made to the related description of the image processing method and the processing apparatus in this specification, and details will not be repeated herein. Various applications and various data may also be stored in the computer-readable storage medium, such as image data sets and various data (such as training data) used and/or generated by the applications.

Embodiments of the present disclosure provide an image processing method, a processing apparatus and a processing device for implementing image conversion processing. The image processing method, the processing apparatus and the processing device generate a feature-converted output image by using the generative neural network, and train the generative neural network by using the sample image in the training database and the loss function, so the system is simple and easy to train. On the basis of this, the generative neural network establishes cross-level connection between different processing levels, so that the output image can not only have the conversion feature, but also retain raw information of the input image, and ensure consistency between the output image and the input image.

The above is only specific implementations of the present disclosure, but the protection scope of the present disclosure is not limited thereto, the protection scope of the present disclosure should be determined by the scope of the claims.

What is claimed is:

1. An image processing method, comprising:
obtaining an input image; and
performing image conversion processing on the input image by using a generative neural network, to output a converted output image, wherein
the generative neural network includes a plurality of processing levels, wherein an output result of an i-th processing level is inputted to an (i+1)-th processing level and a j-th processing level, the j-th processing level further receives an output result of a (j−1)-th processing level, the output result of the (j−1)-th processing level and the output result of the i-th processing level have the same size, wherein
i is less than j−1, i and j are positive integers.

2. The image processing method according to claim 1, wherein
each of the plurality of processing levels of the generative neural network includes a convolution network, and at least a portion of the plurality of processing levels further includes at least one of a downsampling layer, an upsampling layer and a normalizing layer.

3. The image processing method according to claim 1, wherein
in the generative neural network, the number of the downsampling layers is equal to the number of the upsampling layers.

4. The image processing method according to claim 1, wherein the input image serves as a first training image, the output image serves as a first training output image, the image processing method further comprises:
training the generative neural network based on the first training image and the first training output image.

5. The image processing method according to claim 4, wherein training the generative neural network comprises:
inputting the first training output image to a discriminative neural network, and outputting a discriminative tag for whether the first training output image has a conversion feature; and
calculating a loss value of the generative neural network according to the first training image, the first training output image and the discriminative tag and optimizing parameters of the generative neural network, by using a first loss calculation unit.

6. The image processing method according to claim 5, wherein the first loss calculation unit includes an analysis network, a first loss calculator and an optimizer, and optimizing parameters of the generative neural network by using a first loss calculation unit comprises:
outputting, by using the analysis network, content features of the first training image and the first training output image;
calculating, by using the first loss calculator, a loss value of the generative neural network according to content features outputted by the analysis network and the discriminative tag of the first training output image and in accordance with a first loss function; and
optimizing, by using the optimizer, parameters of the generative neural network according to the loss value of the generative neural network, the parameters including convolution kernels and biases of the convolution networks in the generative neural network.

7. The image processing method according to claim 6, wherein
the first loss function includes at least one of a content loss function, a generative neural network loss function and a normalizing loss function.

8. The image processing method according to claim 1, wherein the input image serves as a second training image, the output image serves as a first sample image, the image processing method further comprises:
obtaining a second sample image from a training database;
outputting, by using the discriminative neural network, discriminative tags for whether the first sample image and the second sample image have conversion feature; and
training, by using the second loss calculation unit, the discriminative neural network according to the discriminative tag of the first sample image and the discriminative tag of the second sample image.

9. The image processing method according to claim 8, wherein the second loss calculation unit includes a second loss calculator and an optimizer, and training the discriminative neural network by using the second loss calculation unit comprises:
calculating, by using the second loss calculator, a loss value of the discriminative neural network according to the discriminative tag of the first sample image and the discriminative tag of the second sample image and in accordance with a second loss function, the second loss function including a discriminative neural network loss function;
optimizing, by using the optimizer, parameters of the discriminative neural network according to the loss value of the discriminative neural network, the parameters including convolution kernels and biases of the convolution networks in the discriminative neural network.

10. The image processing method according to claim 8, wherein the training database includes sample images having a conversion feature.

11. An image processing apparatus, comprising:
a generative neural network module configured to perform image conversion processing on the input image to output a converted output image, wherein
the generative neural network module includes a plurality of processing levels, wherein an output result of an i-th processing level is inputted to an (i+1)-th processing level and a j-th processing level, the j-th processing level further receives an output result of a (j−1)-th processing level, the output result of the (j−1)-th processing level has the same size as the output result of the i-th processing level, wherein i is less than j−1, i and j are positive integers.

12. The image processing apparatus according to claim 11, wherein each of the plurality of processing levels of the generative neural network module includes a convolution network, and at least a portion of the plurality of processing levels further includes at least one of a downsampling layer, an upsampling layer and a normalizing layer, wherein in the generative neural network module, the number of the downsampling layers is equal to the number of the upsampling layers.

13. The image processing apparatus according to claim 11, wherein the input image serves as a first training image, the output image serves as a first training output image, and the image processing apparatus further comprises:

a training neural network module configured to train the generative neural network module according to the first training image and the first training output image, wherein the training generative neural network module comprises:

a discriminative neural network module configured to output a discriminative tag for whether the first training output image has a conversion feature; and a first loss calculation unit configured to calculate a loss value of the generative neural network module according to the first training image, the first training output image and the discriminative tag, and optimize parameters of the generative neural network module.

14. The image processing apparatus according to claim 13, wherein the first loss calculation unit comprises:

an analysis network configured to output content features of the first training image and the first training output image;

a first loss calculator configured to calculate a loss value of the generative neural network module according to content features outputted by the analysis network and the discriminative tag of the first training output image and in accordance with a first loss function, wherein the first loss function includes at least one of a content loss function, a generative neural network loss function and a normalizing loss function; and an optimizer configured to optimize parameters of the generative neural network module according to the loss value of the generative neural network module, the parameters including convolution kernels and biases of the convolution networks in the generative neural network module.

15. The image processing apparatus according to claim 13, wherein the training neural network module is further configured to train the discriminative neural network module according to the discriminative tag of the discriminative neural network module, wherein the input image serves as a second training image, the output image serves as a first sample image, an image obtained from a training database serves as a second sample image, and the discriminative neural network module outputs discriminative tags according to the first sample image and the second sample image, wherein the training neural network module further comprises:

a second loss calculation unit configured to train the discriminative neural network module according to the discriminative tag of the first sample image and the discriminative tag of the second sample image.

16. The image processing apparatus according to claim 15, wherein the second loss calculation unit comprises:

a second loss calculator configured to calculate a loss value of the discriminative neural network module according to the discriminative tag of the first sample image and the discriminative tag of the second sample image and in accordance with a second loss function, the second loss function including a discriminative neural network module loss function; and an optimizer configured to optimize parameters of the discriminative neural network module according to the loss value of the discriminative neural network module, the parameters including convolution kernels and biases of the convolution networks in the discriminative neural network module.

17. The image processing apparatus according to claim 15, wherein the training database includes sample images having a conversion feature.

18. An image processing device, comprising:

one or more processors; and one or more memories, wherein the memories store computer-readable codes, the image processing method according to claim 1 is implemented when the computer-readable codes are executed by the one or more processors.

* * * * *

UNITED STATES PATENT AND TRADEMARK OFFICE
CERTIFICATE OF CORRECTION

| | |
|---|---|
| PATENT NO. | : 11,281,938 B2 |
| APPLICATION NO. | : 16/329893 |
| DATED | : March 22, 2022 |
| INVENTOR(S) | : Hanwen Liu et al. |

It is certified that error appears in the above-identified patent and that said Letters Patent is hereby corrected as shown below:

On the Title Page

(71) Applicant Should read: BOE TECHNOLOGY GROUP CO., LTD., Beijing (CN)

Signed and Sealed this
Twenty-first Day of February, 2023

Katherine Kelly Vidal
*Director of the United States Patent and Trademark Office*